United States Patent

Hanada

[15] 3,651,368
[45] Mar. 21, 1972

[54] HALL MOTOR INCLUDING MEANS FOR SELECTIVELY VARYING THE EFFECTIVE NUMBER OF TURNS OF THE EXCITING WINDINGS

[72] Inventor: Toshihide Hanada, Yokohama, Japan
[73] Assignee: Pioneer Electronic Corporation, Tokyo, Japan
[22] Filed: June 24, 1970
[21] Appl. No.: 49,479

[30] Foreign Application Priority Data

June 24, 1969 Japan..................................44/49319

[52] U.S. Cl..............................318/254, 310/189, 318/305, 318/337, 318/354, 318/347, 318/502
[51] Int. Cl...............................................H02k 29/00
[58] Field of Search.................318/345, 332, 347, 348, 254, 318/138, 305, 337, 354, 502, 538, 531; 310/10 HR, 189

[56] References Cited

UNITED STATES PATENTS

| | | | |
|---|---|---|---|
| 3,440,506 | 4/1969 | Krestel et al. | 318/254 X |
| 3,159,777 | 12/1964 | Manteuffel | 318/345 X |
| 3,348,113 | 10/1967 | Vichr | 318/305 X |
| 3,448,359 | 6/1969 | Engel | 318/138 |
| 3,517,289 | 6/1970 | Brunner et al. | 318/138 |
| 3,518,517 | 6/1970 | Rainer | 318/138 |

*Primary Examiner*—G. R. Simmons
*Attorney*—Sughrue, Rothwell, Mion, Zinn & Macpeak

[57] ABSTRACT

A Hall motor utilizing Hall elements in place of the conventional commutators provides for speed variation with the motor efficiency unchanged. The motor comprises a control circuit having speed control switches and resistors. Speed control switches selectively switch the resistors into the control circuit which includes a transistor the base of which is controlled by the potential across the resistors. The motor further comprises driving transistors connected with exciting windings of the motor having intermediate taps. Switches are provided for selectively coupling the intermediate taps of the exciting windings to the driving transistors. Hall elements with their voltage terminals connected in the base circuits of the driving transistors are provided for varying the bias to the base circuits of the driving transistors. The speed control switches and the switches for selectively connecting the intermediate taps to the driving transistors are coupled in an interlocked relationship.

In a modified form of the invention, the Hall motor includes double-pole double-throw switches for changing the flow direction of the exciting current passing through the exciting windings thus providing bidirectional operation as well as variable speed control.

4 Claims, 6 Drawing Figures

HALL MOTOR INCLUDING MEANS FOR SELECTIVELY VARYING THE EFFECTIVE NUMBER OF TURNS OF THE EXCITING WINDINGS

BACKGROUND OF THE INVENTION

This invention relates to an electric motor and more particularly to a Hall motor which utilizes Hall elements in place of commutators as in conventional motors.

In the prior art, Hall motors having a circuit structure as shown in FIG. 1 have been manufactured and used where it was desired to change the motor speed or revolution rate. Such a prior art motor included a control circuit C having speed control switches $S_1$ and $S_2$. In such motors, the speed can be changed simply by switching the positions of switches $S_1$ and $S_2$ in the control circuit.

In more detail, in response to the switching of switches $S_1$ and $S_2$ of the control circuit the bias potential at the base of transistor $T_1$ varies. Transistor $T_2$ is controlled by varying the bias to the base of transistor $T_1$. Variation of this bias causes a change in the collector current of the transistor $T_1$ which in turn causes the collector current of transistor $T_2$ to increase or decrease. As the collector current of the transistor $T_2$ increases, the control current flowing through the Hall elements $H_1$ and $H_2$ in the Hall motor is increased. Because of this, a Hall generation voltage increases causing the current which is flowing in the exciting windings or field windings $W_1$, $W_2$, $W_3$ and $W_4$ of the Hall motor to increase, which in turn allows for an increase in the speed of the Hall motor. However, if switches $S_1$ and $S_2$ of the control circuit are switched so as to decrease the collector current in transistor $T_2$, the speed of the Hall motor will decrease.

The prior art motor of FIG. 1 operates in accordance with the characteristic curves shown in FIG. 2. This figure depicts a torque T of the Hall motor along the horizontal axis with respect to the characteristics of rotation frequency $n$, exciting current I and efficiency $\eta$, each of which is depicted on the vertical axis. The curve designated $n_o$ is a fundamental rotation frequency - torque characteristic curve of a Hall motor. This corresponds to the situation where the control circuit C is not connected. The rotation frequency - torque characteristic curves $n_1$ and $n_2$ represent two conditions where the control circuit C is connected and operating. When the speed control switches $S_1$ and $S_2$ connect resistors $R_1$ and $R_4$ in the circuit, the rotation frequency - torque characteristic curve takes the form of curve $n_1$, the exciting current - torque characteristic takes the form of curve $I_1$, and the efficiency - torque characteristic takes the form of curve $\eta_1$. Under these conditions, if the speed changeover switches $S_1$ and $S_2$ are switched to connect resistors $R_2$ or $R_3$ and $R_5$ or $R_6$ into the circuit, the speed characteristic changes. The rotation frequency - torque characteristic $n_2$ represents a possible situation if the switches $S_1$ and $S_2$ are switched to another position. However, even if $S_1$ and $S_2$ are switched, the exciting current $I_2$ has exactly the same value as it had before. Therefore, the exciting current - torque characteristic curve for exciting current $I_2$ is identical to the exciting current - torque characteristic for an exciting current $I_1$. On the other hand, the efficiency varies. This is depicted as characteristic curve $\eta_2$ which differs markedly from the efficiency - torque curve $\eta_1$. Thus, in the prior art Hall motors, a change in motor speed causes a variation in efficiency.

It is, therefore, an object of the present invention to provide a Hall motor, the efficiency of which does not decrease even if there is a change in motor speed.

In addition, prior to the invention there has not been manufactured a Hall motor which is bidirectional. Thus, it is another object of the invention to provide a Hall motor which is bidirectional, that is, one which can be rotated in either a clockwise or counterclockwise direction. It is a further object of the invention to provide a variable speed, bidirectional Hall motor.

SUMMARY OF THE INVENTION

As one feature of the present invention, there is provided a Hall motor which comprises a control circuit having speed control switches and resistors forming a plurality of potential dividers which are selectively switched into the control circuit by means of the speed control switches and a transistor the bias to the base of which is switched by said switches, driving transistors connected to exciting windings of the motor the windings having intermediate taps, switches for switching the driving transistors to different ones of the intermediate taps and Hall elements with their voltage terminals connected with the base circuits of the driving transistors, said speed control switches and the switches for selectively coupling the driving transistors to the different taps of the exciting windings being coupled in an interlocked relation.

Another feature of the present invention is that the foregoing Hall motor includes double-pole double-throw switches for changing the flow direction of the exciting current passing through the exciting windings thereby providing for bidirectional operation.

Description of the Preferred Embodiments

Figure 1:
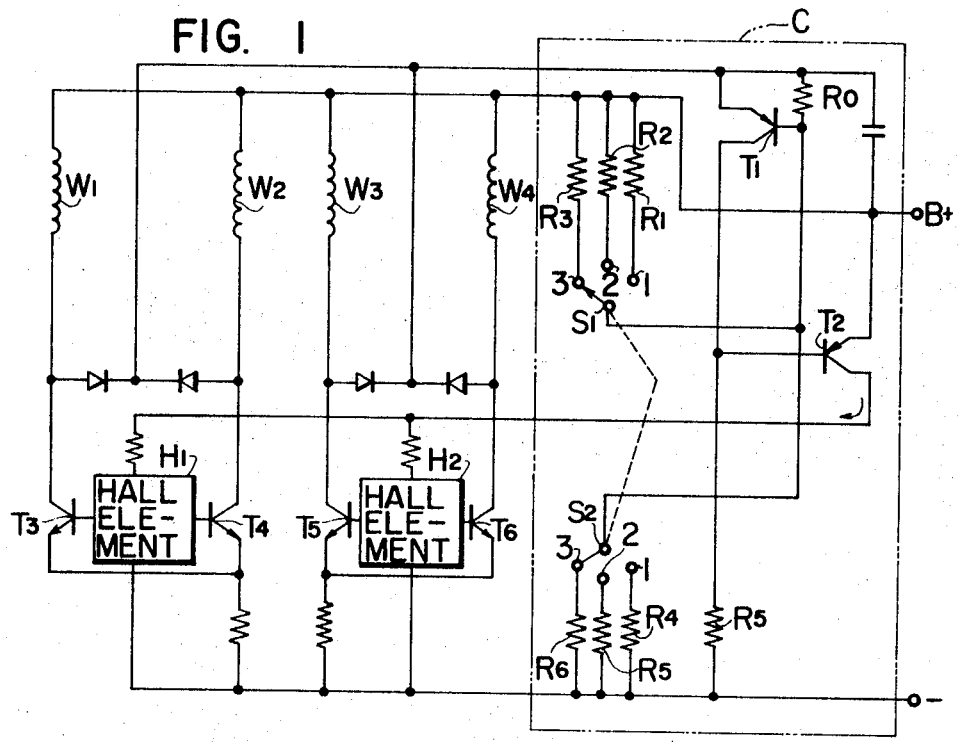
FIG. 1 is an electric circuit diagram of a conventional variable speed Hall motor.
Figure 2:
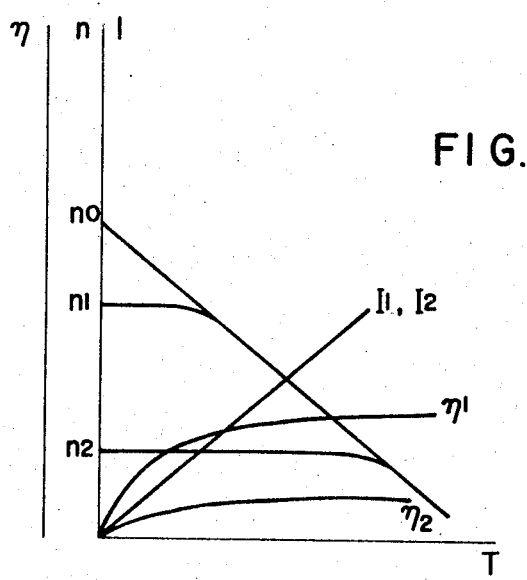
FIG. 2 shows several characteristic curves of the motor shown in FIG. 1 relative to torque variation.
Figure 4:
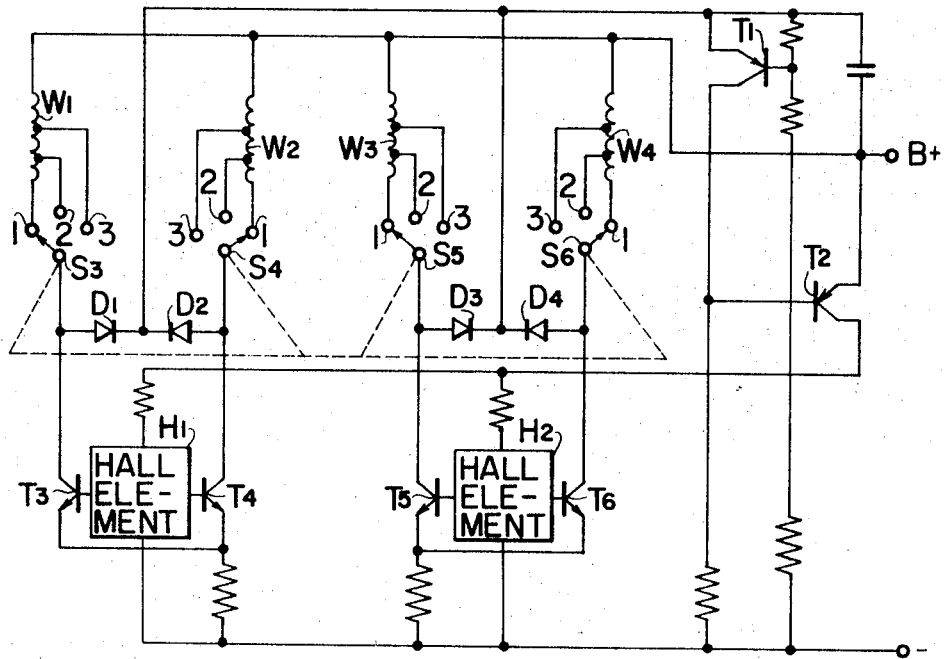
FIG. 4 is a basic circuit diagram of the motor according to the present invention.

Referring first to FIG. 4, transistors $T_1$ and $T_2$ are part of the speed control circuit while transistors $T_3$, $T_4$ and $T_5$, $T_6$ correspond to the driving transistors. These driving transistors derive their base voltages from their corresponding Hall elements $H_1$ and $H_2$. Exciting windings or field windings $W_1$ through $W_4$ have, respectively, intermediate taps 2, 3 connected to corresponding terminals of switches $S_3$, $S_4$, $S_5$ and $S_6$. The moveable contacts of switches $S_3$ through $S_6$ are connected to the corresponding collectors of the transistors $T_3$ and $T_6$. Diodes $D_1$ through $D_4$ have their anodes connected to the corresponding collectors of the transistors $T_3$ through $T_6$, and their cathodes connected in parallel to a speed control transistor $T_1$. Transistor $T_2$ is connected at its base to the collector circuit of the transistor $T_1$. Thus, the base potential of transistor $T_2$ is derived from the output of the collector transistor $T_1$. The collector current of the transistor $T_2$ flows into the current terminals of the aforesaid Hall elements $H_1$ and $H_2$. The Hall elements $H_1$ and $H_2$ sense the magnetic field generated by the rotor of the motor and generate Hall voltages which are supplied as a base voltage alternately to transistors $T_3$, $T_4$ and $T_5$, $T_6$. In this manner the transistors $T_3$ through $T_6$ generate alternating collector voltages to cause exciting current to flow into the exciting windings.

Figure 3:
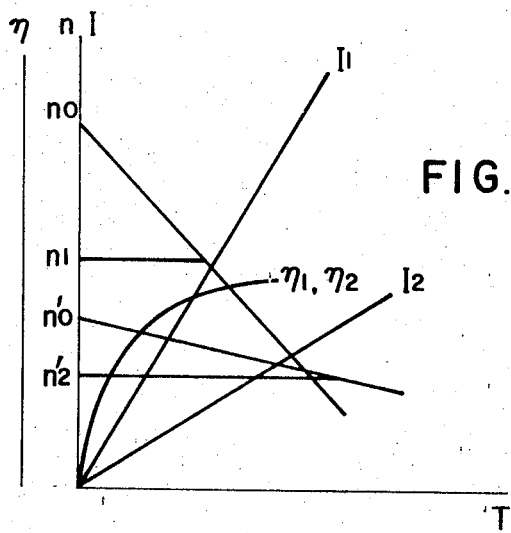
FIG. 3 shows several characteristic curves of a motor constructed in accordance with the present invention relative to torque variation.

If the moveable contacts of the switches $S_3$ through $S_6$ are connected to their respective terminals 1, exciting current flows through the entire length of the exciting windings. Under such conditions the rotation frequency-torque characteristic curve takes the form of curve $n_2'$ shown in FIG. 3. In this figure, the curve $n_0'$ represents the rotation frequency - torque characteristic when the control circuit is not connected. It is understood, however, that the motor does not operate under this condition. The motor which is operating under the characteristic curve $n_2'$ exhibits the current - torque characteristic curve $I_2$. As is well known in the art, the efficiency of such a motor is given by the product of the torque and the number of revolutions (that is the output of the motor) divided by the product of the exciting current and the line voltage (that is, the motor input). With the motor operating according to the characteristic curve $n_2'$ the efficiency of the motor is represented by the curve $\eta_2$.

Assume that switches $S_3$ through $S_6$ of this motor are switched simultaneously (or under the control of the interlocked relation therebetween) to shift to the respective taps 3. As a result, the number of effective turns in each of the exciting windings decreases, so that, if the speed control circuit is absent, the rotation frequency - torque characteristic will change to the curve $n_0$. However, since the speed control circuit is in actuality connected the characteristic curve for the rotation - torque characteristic takes the form of curve $n_1$.

As is also known in the art, the torque T is proportional to the product of the armature current $I_a$, magnetic flux $\phi$, and the number of turns in the exciting windings. This relationship is given mathematically by the equation:

$$T = K N \phi I_a$$

where $K$ is a constant determined by the configuration of the motor. Therefore, when switches $S_3$ through $S_6$ are switched, the number of turns $N$ decreases while $K$ and $\phi$ remain constant. Thus, in order to produce the same torque as that produced prior to the switching of the switches $S_1$ to $S_6$, the exciting current or $I_a$ has to be increased by an amount corresponding to the decreased part of the winding turns. Thus, the current - torque characteristic after having switched switches $S_1$ to $S_6$ varies along the curve $I_1$ in FIG. 3. The efficiency in this case is the product of the torque T and the rotation frequency $n_1$ divided by the product of the line voltage and the current $I_1$ and is represented by the curve $\eta_1$ in FIG. 3. Accordingly, if the value of $n_1$ versus $n_0$ is determined by the manipulation of the control circuit so as to be proportional to the value of $n_2'$ versus $n_0'$, the values of $\eta_1$ and $\eta_2$ become substantially identical. Therefore, irrespective of the rotation frequency, it is possible to drive the motor at a high efficiency.

Figure 5:
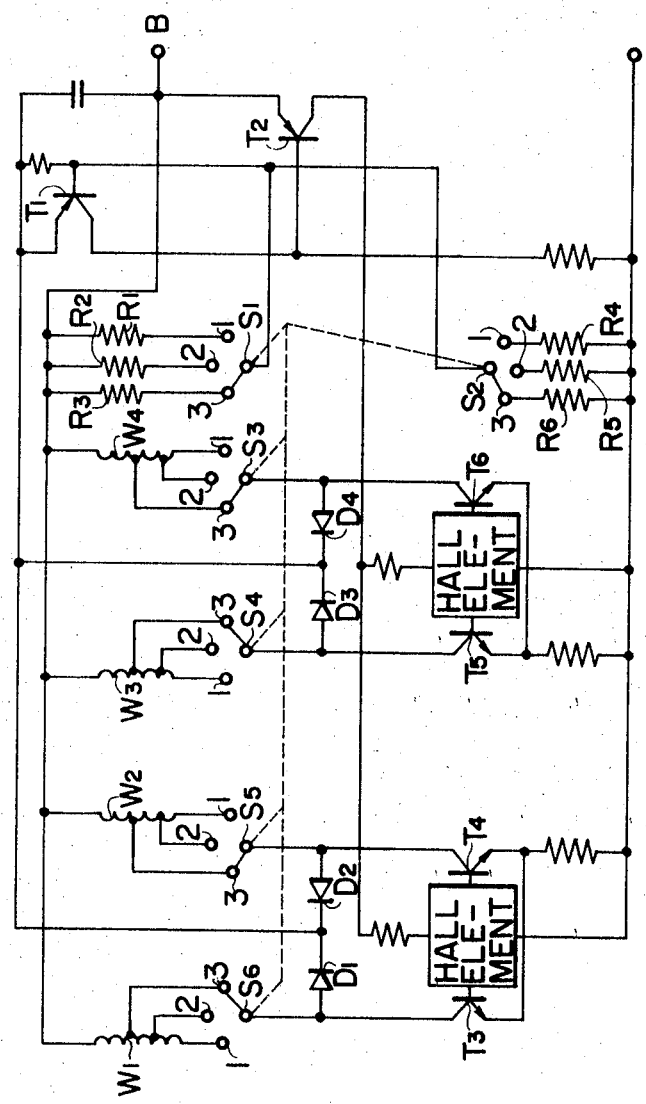
FIG. 5 shows an embodiment of the variable speed type Hall motor according to the present invention.

FIG. 5 shows an example of the practical circuit in which the speed variation feature is incorporated in accordance with the present invention. In this circuit, the bias circuit connected to the base of transistor $T_1$ in the speed control circuit is switched in the same manner as the prior art system, and the exciting windings of the present invention are also changed.

When the switches $S_1$ through $S_6$ are used to effect such switching action they are switched by means of an interlocked relationship so that the winding turns of the exciting windings decrease at the same time the bias resistors $R_1$, $R_2$ and $R_3$ are also switched to increase or decrease the resistance and the resistors $R_4$, $R_5$ and $R_6$ are switched to decrease or increase in resistance to give appropriate values. Thus, in consequence of the foregoing operation, it becomes clear that the speed can be increased to reach a given value with the efficiency retained substantially constant.

When the rotation frequency is to be decreased, this can be accomplished by increasing the effective number of turns in the exciting windings.

Figure 6:
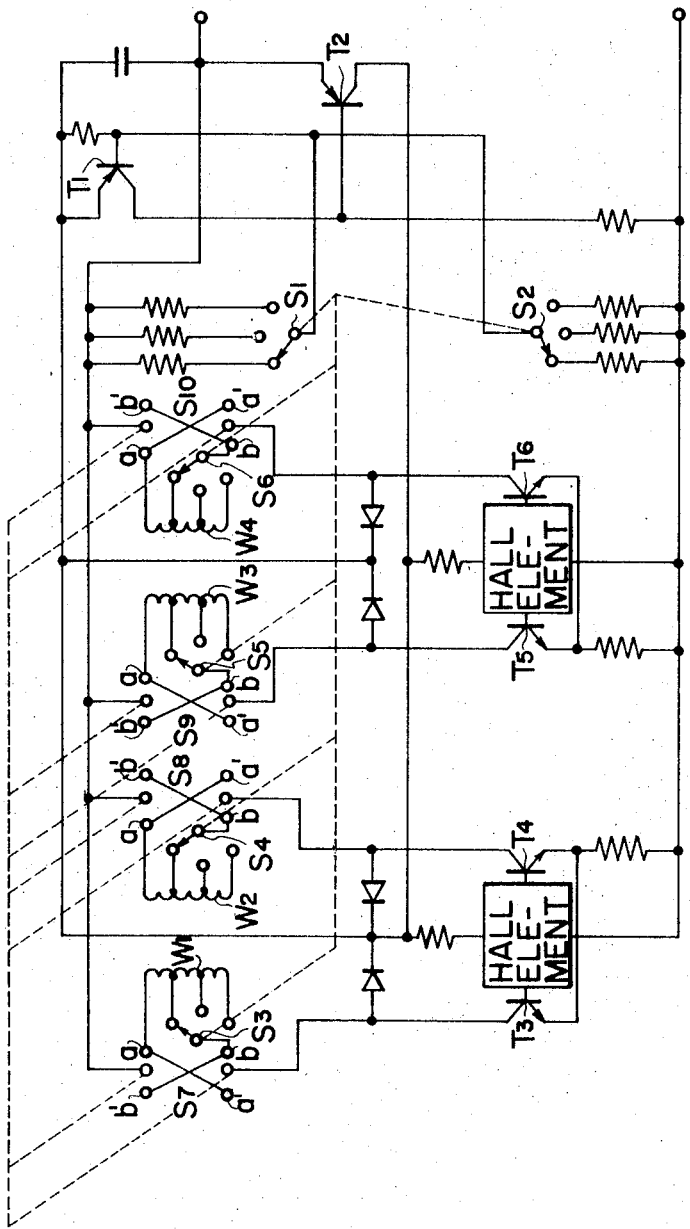
FIG. 6 shows an embodiment of the bidirectional, variable speed type Hall motor according to the present invention.

FIG. 6 shows an example of the circuit which was designed for easy speed control operation in addition to bidirectional operation. That is, this embodiment can accomplish the speed variation action while operating with the rotor rotating either clockwise or counterclockwise.

To explain the operation of the circuit of FIG. 5 in more detail, the intermediate taps of the exciting windings $W_1$ through $W_4$ are connected, respectively, to the switches $S_3$ through $S_6$ as described above. The moveable contacts of the respective switches $S_3$ through $S_6$ and the other ends of the exciting windings $W_1$ through $W_4$ are connected, respectively, to the corresponding contacts $a$ and $b$ of the double-pole double-throw switches $S_7$ through $S_{10}$ with one of the poles of the DPDT switches connected to the B power source with the other one of the poles connected to the corresponding collectors of transistors $T_3$ through $T_6$.

If the moveable contacts of the DPDT switches $S_7$ through $S_{10}$ are thrown to the $a$, $b$ contact side, the beginnings of the exciting windings connected to the contacts $a$ are connected to the B power source and the ends of the exciting windings connected through the switches $S_3$ through $S_6$ to the respective contacts $b$ are connected to the corresponding collectors of the transistors $T_3$ through $T_6$. Thus, if the moveable contacts of the switches $S_7$ through $S_{10}$ are thrown to the $a'$, $b'$ contact side, the beginnings of the exciting windings are connected to the transistors $T_3$ and $T_6$ and the winding end of the exciting windings are connected to the B power source, so that, the flow direction of the exciting current in the exciting windings is reversed thus, the rotating magnetic filed generated thereby rotates in the opposite direction with respect to the previous direction, therefore, the rotor of the motor rotates in the opposite direction.

As was described hereinabove, the double-pole double-throw switches $S_7$ through $S_{10}$ are switched in interlocking relation. In addition, the change of the rotation frequency is accomplished simply by switching the switches $S_1$ through $S_6$, thereby effecting speed variation while maintaining the efficiency of substantially constant value.

As is appreciated from the foregoing description, in accordance with the present invention there has been provided the Hall motor having the aforesaid structure. The present invention Hall motor can accomplish adjustment of the rotation frequency without resulting in a variation of efficiency, and in addition provides for bidirectional operation which has heretofore been unattained with prior art Hall motors. Accordingly, it is clear that the present motor has high efficiency and varies in its use due to the combination of bidirectionality and the capability of variable speed control. Thus, the present Hall motor is very suitable for use as a motor for tape recorders which are required to have forward normal speed, forward fast speed, reverse normal speed, and reverse fast speed functions. While the preferred embodiments of the invention have been described herein, it is to be appreciated that variations and modifications may be made without departing from the spirit of the invention.

I claim:

1. A Hall motor of the type having a plurality of exciting windings, driving transistors for driving said windings and Hall elements for varying the bias to the base circuits of said driving transistors, the invention comprising,
    a. control means, including means for varying the control current flowing in the Hall elements, to control the speed of said motor, and
    b. means coupled to said exciting windings for varying the effective number of turns of said exciting windings in response to desired speed variations to compensate for the loss in efficiency on the variation of motor speed.

2. The Hall motor of claim 1 wherein said control means further includes, a plurality of voltage divider circuits, each for providing a different output potential, and speed control switch means, connected between said plurality of voltage dividers and said means for varying the current for coupling said means for varying the current to each of said voltage dividers, and
    wherein said means for compensating comprises a plurality of taps on each of said plurality of said exciting windings and a plurality of switch means one coupled to each of said windings, each switch means having a number of fixed terminals corresponding to the number of taps on its associated winding and a moveable contact for selectively connecting said driving transistors to one of the taps of each of said plurality of windings.

3. The Hall motor of claim 2 further comprising, means connecting said plurality of moveable contacts to said speed control switch means for placing said moveable contacts in an interlocking relationship with said speed control switch means.

4. A Hall motor as claimed in claim 3 further comprising double-pole double-throw switches for changing the flow direction of exciting current flowing through said exciting windings, two poles of each of said switches being connected respectively to a B power source and the collector of a corresponding one of said driving transistors.

* * * * *